Oct. 22, 1957 E. W. WORK 2,810,527
TEMPERATURE AND PRESSURE RELIEF VALVE
Filed Feb. 3, 1954
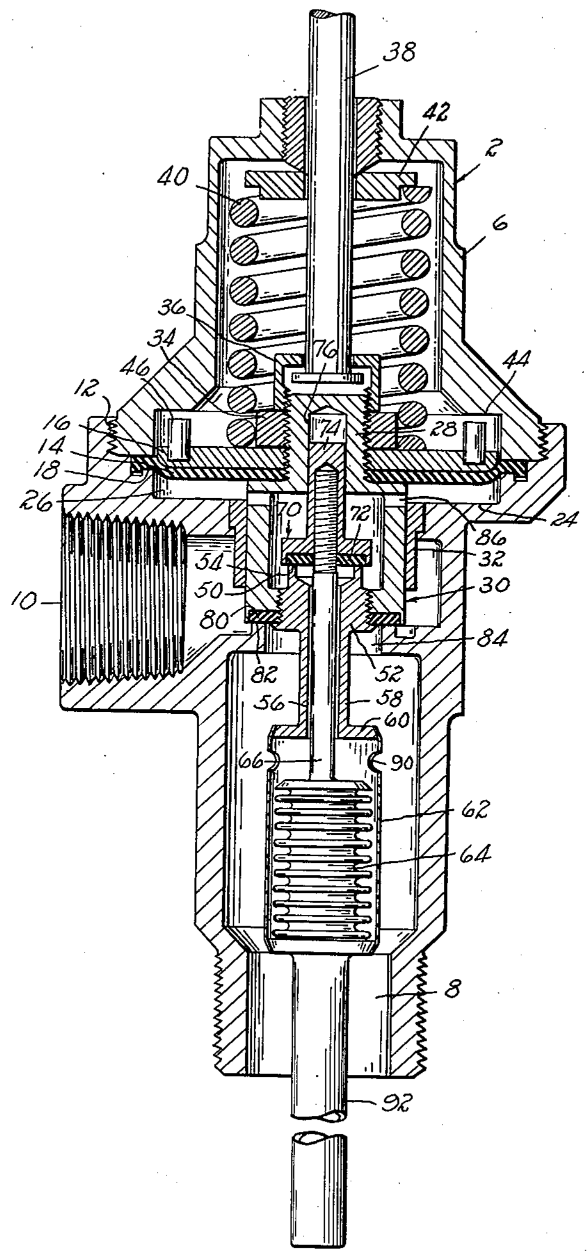
INVENTOR.
ERICH W. WORK
BY
Lindsey and Prutzman
ATTORNEYS United States Patent Office 2,810,527

Patented Oct. 22, 1957

2,810,527

TEMPERATURE AND PRESSURE RELIEF VALVE

Erich W. Work, New Britain, Conn.

Application February 3, 1954, Serial No. 407,984

11 Claims. (Cl. 236—80)

The present invention relates to pressure and temperature relief valves for hot water supply systems and the like.

The principal object of the present invention is to provide a temperature and pressure relief valve having improved flexibility, dependability and safety of operation.

Another object is to provide a pressure and temperature relief valve which affords a selectively higher flow capacity for steam than for hot water.

Another object is to provide a pressure and temperature relief valve which is especially suited for improved safety of operation with steam.

Another object is to provide a relief valve of the character described which automatically prevents the accumulation of an excessive or dangerous quantity of steam in the system.

Another object is to provide a pressure and temperature relief valve which, in operation responsive to temperature, provides a large relief capacity even though the actual temperature excess is small.

Another object is to provide a temperature and pressure relief valve so constructed and arranged as to open a limited amount as necessary to relieve excessive pressures, while opening a substantial amount to relieve excess temperatures.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawing, the single figure is a sectional view of a valve constructed in accordance with the present invention.

A valve constructed in accordance with the present invention includes a generally cylindrical hollow body 2 formed by a lower casing 4 and an upper casing 6. Lower casing 4 has an axial inlet 8 at its lower end and a laterally extending outlet 10 adjacent its upper end. Lower casing 4 also has an internally threaded flange 12 at its upper end within which the upper casing 6 is received and supported in coaxial alignment with the lower casing. Separating the interior of the upper casing 6 from the lower casing is an axially movable transverse partition or wall in the form of a flexible diaphragm 14 backed up by a stiff backing plate member 16. Diaphragm 14 is supported at its periphery on an annular shelf 18 in lower casing 4, and is clamped to the shelf 18 by an abutting flange 20 on the inner end of the upper casing 6. The diaphragm 14 is thus capable of limited axial movement within body 2, but is stiffened by plate 16 so that it acts like a movable partition or piston. The lower casing 4 is relieved beneath the diaphragm 14 and has a rigid transverse partition 24 which forms a shallow cylindrical expansion chamber 26 closed at its top by the diaphragm.

The diaphragm 14 is apertured at its center to receive an axially disposed main valve stem 28 on which is integrally supported a main valve 30. The main valve is axially slidably received in a bushing 32 supported in a central aperture in transverse partition 24. The main valve stem 28 is externally threaded, and extends through a threaded aperture in the backing plate 16, a spacer disc 34, and a hollow cup-shaped connecting link 36 within which is retained the flanged end of the stem 38 of a manual relief linkage for the valve, not shown. The arrangement is such that the connecting link 36, spacer disc 34, plate 16, diaphragm 14 and main valve 30 are securely clamped together and held by the threaded stem 28 of the main valve so as to form a rigid unitary structure.

The diaphragm 14 and backing plate 16 are urged downwardly by a compression spring 40 acting between the backing plate 16 and a spring retainer 42 supported from a bushing coaxially threaded into the top of the upper casing 6. Adjacent its lower end the inside wall of upper casing 6 is relieved to provide a flat annular shoulder 44 parallel to the backing plate 16 which provides a positive stop for limiting the upward movement of the backing plate and diaphragm 14 during operation of the relief valve. Spaced about the periphery of backing plate 16 on its upper side is a plurality of upstanding fuse blocks 46 of the proper height to limit the upward movement of the diaphragm and backing plate as desired during operation of the valve.

The main valve 30 is hollowed out at its lower end to provide a cylindrical passage 50 coaxial with the upper and lower casings. The bottom end of cylindrical passage 50 is closed by a plug 52 threaded therein and having an annular pilot valve seat 54 upstanding from its inner side. The plug 52 is bored out coaxially to form a passage 56 which connects the valve seat 54 with a hollow tube 58 depending coaxially from the lower side of plug 52 and having at its lower end an annular flange 60. From the annular flange 60 is supported the top of a cylindrical bellows casing 62 disposed coaxially within inlet 8. Supported at its lower end within bellows casing 62 is a bellows 64 having a stem 66 which extends axially from its upper end through the tube 58 and the bore in plug 52 into the cylindrical passage 50 in main valve 30. The upper end of stem 66 is threaded, and axially adjustably supported thereon is a pilot valve 70 having an annular valve disc 72 on its lower side which is adapted to seat against the pilot valve seat 54. The upper side of the pilot valve 70 is formed with a guide pin 74 which is slidably received within an axial cylindrical bore 76 provided in the main valve stem 28 for the purpose of guiding and preserving the coaxial alignment of the pilot valve 70 and the bellows stem 66 during operation of the relief valve.

The bottom side of main valve 30 is cut away to receive an annular main valve disc 80 which is secured thereon by a peripheral flange on plug 52. Adjacent the bottom side of main valve 30 the lower casing 4 is provided with an integral annular main valve seat 82 which defines an inlet orifice 84 through which fluid may flow from inlet 8 to outlet 10 when main valve 30 is open. The main valve is provided with ports 86 which connect main valve passage 50 to the expansion chamber 26. The ports are so located in the side of the main valve as to communicate with the chamber 26 when the main valve is in its lowermost or closed position, resting on main valve seat 82.

The bellows 64 is filled with a heat-expansible fluid, and holes 90 are provided in the sides of bellows casing 62 to admit fluid from the inlet 8 of the relief valve into heat-conducting contact with bellows 64. At its bottom end the bellows has a long hollow tubular extension 92 which is also filled with the temperature-responsive fluid and is disposed in heat-conducting relation with whatever fluid may enter inlet 8.

The operation of the valve is as follows:

In operation due to pressure of the fluid in inlet 8, the fluid pressure in the inlet acts directly on the exposed area of main valve 30. When the pressure in the inlet is sufficient to overcome the force exerted by spring 40, the main valve lifts and relieves the pressure. When the pressure has been relieved, the main valve is immediately closed by spring 40. Thus loss of hot water from the system will be kept to a minimum.

When the hot water in the inlet reaches a higher temperature than is desired for the system, the fluid in the tube and the bellows expands, lifting the bellows stem 66 and unseating the pilot valve 70. This permits hot water to flow from inlet 8 through the holes 90 in bellows casing 62, up through tube 58 and plug 52, past the pilot valve seat 54, and into the passage 50 in the main valve. From there the fluid flows through the ports 86 into the expansion chamber 26. The fluid reaching the chamber 26 has a pressure at least equal to the pressure of the cold water source to which the system is normally connected, and will therefore be able to exert this pressure against the movable wall formed by the diaphragm 14 and backing plate 16. Since the area of this movable wall exposed to the fluid pressure in chamber 26 is much larger than the area of the main valve exposed through orifice 84 to the pressure of fluid in inlet 8, the force developed on the diaphragm will be substantial, and is sufficient to overcome the compression of spring 40, and displace the diaphragm upwardly. Upward movement of diaphragm 14 carries upward with it the main valve 30, which of course lifts from the main valve seat, opening the inlet orifice, and connecting inlet 8 with outlet 10. This opening of the main valve permits the hot water in the inlet to flow out the outlet. Flow of the hot water from the inlet to the outlet is then produced by the pressure of the cold water source to which the system is normally connected. As the hot water leaving the system is replaced by cold water from the source, the temperature drops, permitting the bellows to contract and the pilot valve to close. After the pilot valve closes, any fluid trapped in the shallow cylindrical chamber seeps down the outside wall of the main valve into the outlet and is carried away, thus preventing accumulation of fluid in the chamber.

It will be appreciated that with the arrangement described, large volume relief is provided by the main valve, even though the temperature rise in the inlet is only sufficient to open the pilot valve a small amount, since opening of the pilot valve immediately applies fluid pressure to the diaphragm and insures that the main valve will be opened a substantial amount. This operation is in marked contrast to conventional relief valves, where the valve opening, and hence relief capacity, is proportional to temperature rise and requires an extreme temperature rise to provide substantial relief capacity. Since the bellows need expand only a slight amount to open the pilot valve and bring about the desired relief, this arrangement also avoids excessive stretching of the bellows and prolongs its life.

Because of the capacity of steam to expand to many times its volume, it will be appreciated that admission of steam to pressure chamber 26, where it can act against diaphragm 14, will produce a substantially larger lift of main valve 30 than the lift obtainable by admission of mere hot water to chamber 26. Thus the present arrangement inherently provides a larger flow capacity for the relief of steam than hot water, which is highly advantageous from the standpoint of safety, to avoid accumulation of a dangerous quantity of steam in the inlet 8.

Since the entire pilot valve assembly, including the pilot valve 70, pilot valve seat 54, bellows stem 66, bellows 64, and bellows casing 62 is carried in axially disposed relation by the main valve 30, it will be appreciated that lifting of main valve 30 does not change the relationship of the pilot valve 70 and pilot valve seat 54. Thus, so long as the fluid in the inlet remains at a sufficient temperature to keep the bellows expanded, the pilot valve will stay open, whether the main valve is open or not. This means that if by accident the fresh water supply to the system should become shut off, so that the excessively heated water in inlet 8 would not be forced out outlet 10 by the pressure of the cold water supply, and a condition of excessively heated water in the inlet would result, steam formed in the inlet can flow through the open pilot valve, exert its pressure on diaphragm 14, and lift main valve 30. Thus opening of the main valve responsive to the excessive heating and formation of steam in the water in the inlet does not have to await the generation of steam pressure in the inlet sufficient to act directly on the main valve against the compression of spring 40. The pressures at which relief valves of the type here concerned are set to open are such that the water in the inlet would have to be heated to an extremely high temperature before sufficient steam pressure to open the main valve directly would be generated. Such high temperatures of course are inherently very dangerous, and in the event of a rupture in the system would cause a severe explosion. Thus a valve constructed and operating as above described, whereby the temperature-actuated pilot valve is held open to permit any steam generated in the system to act directly upon the diaphragm and open the main valve easily with very low steam pressures, is extremely advantageous in insuring safe operation under all conditions.

As a further safety factor, the fuse blocks 46 are provided to insure an extra large flow capacity for valve 30 under emergency conditions of excessive temperature in the inlet. These blocks are designed to melt at a particular desired temperature above the boiling point of water, such as for example, 250 degrees. Thus, when steam at such a temperature is generated, the blocks will melt and permit an extra large upward displacement of the movable wall and an extra large lift of main valve 30. The valve therefore has an extra large relief capacity, measured in terms of B. t. u.'s, for steam at excessive temperatures.

The amount of fluid in bellows 64 and tube 92 is preferably such that when the bellows is cold, the liquid contracts sufficiently to produce a partial vacuum in the bellows. Also, the size of the top of the bellows, against which the pressure of fluid in inlet 8 can exert a downward force, is preferably larger than the area of the pilot valve exposed to pressure of fluid in the inlet. Thus the unbalance of fluid pressure acting downwardly on the bellows and upwardly on the pilot valve, together with the partial vacuum inside the bellows, insures that the pilot valve will normally remain closed firmly against the pilot valve seat.

The use of a pilot valve actuated by the bellows eliminates the necessity of the bellows exerting the large force necessary to open the main valve and permits a large volume relief from the inlet through the main valve, even though the temperature rise in the inlet is sufficient to open the pilot valve only a slight amount. This provides the large flow capacity necessary to properly relieve steam from the inlet in the case of a runaway boiler, where the temperature increase in the inlet would not be sufficient to extend the bellows directly in proportion to the needed flow capacity.

Should a rupture of the bellows occur, the valve "fails safe," because regardless of the temperature in the system, once the fluid pressure in the inlet is communicated to the inside of the bellows, the unbalance between downward pressure on the top of the bellows and upward pressure on the pilot valve is removed, and this permits the pilot valve to be lifted by the pressure in the inlet. This opening of the pilot valve insures that any pressure in the inlet due to the generation of steam or otherwise will be communicated directly to the diaphragm and cause the main valve to open, to relieve the system.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. A temperature and fluid relief valve assembly comprising a body having an inlet and outlet, a pressure responsive main valve for impeding flow of fluid between the inlet and outlet, a recess in said body forming a fluid chamber, a piston in said fluid chamber connected to the main valve for movement thereof in response to fluid pressure acting between said body and one side only of said piston, fluid passage means to connect said one side only of the piston to inlet fluid pressure, an auxiliary valve in said fluid passage means and carried by said main valve for impeding flow of fluid to said one side of the piston, and temperature sensitive means carried by said main valve to actuate said auxiliary valve in response to a predetermined inlet fluid temperature.

2. A temperature and pressure relief valve assembly comprising a body having an inlet and an outlet, a main valve closing said outlet and adapted to be opened responsive to pressure of fluid in said inlet, a pressure chamber having one side closed by a movable diaphragm, said diaphragm having an area substantially larger than said inlet, means connecting said main valve to said diaphragm for opening said main valve responsive to pressure in said chamber on said diaphragm, spring means urging said diaphragm into said chamber to close said main valve, a passage in said main valve connecting said inlet to said pressure chamber, a pilot valve carried by said main valve closing said passage, temperature-sensitive means for opening said pilot valve responsive to excessive temperature in said inlet, whereby inlet fluid is admitted to said pressure chamber and operates against said diaphragm to open said main valve, and means supporting said temperature-sensitive means from said main valve, whereby said pilot valve remains open responsive to excessive temperature in said inlet, regardless of the position of said main valve.

3. A pressure and temperature relief valve assembly comprising a body having an inlet and outlet, a main valve separating said inlet and outlet and adapted to be opened responsive to pressure in said inlet, an expansion chamber in said body, a movable wall closing said expansion chamber and having an area substantially larger than said main valve, means supporting said main valve from said movable wall, a spring in said body urging said movable wall in one direction to hold said main valve closed, whereby fluid pressure in said inlet overcoming said spring displaces said main valve and movable wall to open said main valve, a passage in said main valve connecting said inlet to said expansion chamber, a pilot valve in said passage carried by said main valve, and heat-sensing means in said inlet carried by said main valve and adapted to open said pilot valve responsive to predetermined temperature in said inlet, whereby fluid is admitted from said inlet to said expansion chamber and displaces said movable wall to open said main valve.

4. A pressure and temperature relief valve assembly comprising a hollow body having an inlet and outlet, an orifice connecting said inlet to said outlet, a main valve for said orifice, an expansion chamber in said body, a movable wall for said expansion chamber having an area substantially larger than said orifice, means supporting said main valve from said movable wall to normally close said orifice and to open said orifice responsive to expansion of said chamber, a spring in said body compressing said movable wall into said expansion chamber to hold said main valve closed, whereby fluid pressure in said inlet overcoming said spring opens said main valve, a passage in said main valve connecting said inlet to said expansion chamber, a heat expansible bellows in said inlet, means supporting said bellows from said main valve, a pilot valve carried by said bellows for normally closing said passage and adapted to open said passage responsive to heat expansion of said bellows, whereby fluid is admitted from said inlet to said expansion chamber responsive to expansion of said bellows, and fluid pressure in said expansion chamber displaces said movable wall to open said main valve.

5. A pressure and temperature relief valve assembly comprising a hollow body having an axial inlet and an outlet, a transverse orifice connecting said inlet to said outlet, an axially disposed main valve for said orifice, an expansion chamber in said body, an axially movable wall closing said expansion chamber and having an area substantially larger than said orifice, means connecting said main valve to said movable wall, a spring in said body compressing said movable wall into said expansion chamber to hold said main valve closed, whereby fluid pressure in said inlet overcoming said spring opens said main valve and connects said inlet and outlet, an axial passage in said main valve connecting said inlet to said expansion chamber, a partially evacuated heat expansible bellows axially disposed in said inlet, means supporting said bellows from said main valve, a stem on said bellows extending axially into said passage, and a pilot valve on said stem for normally closing said passage and adapted to open said passage responsive to heat expansion of said bellows, whereby fluid is admitted from said inlet to said expansion chamber responsive to expansion of said bellows, and fluid pressure in said expansion chamber displaces said movable wall to open said main valve.

6. A pressure and temperature relief valve assembly comprising a hollow cylindrical body having an inlet at one end, first and second spaced transverse partitions in said body, an outlet in said body between said partitions, an axially displaceable transverse diaphragm in said body spaced from said first partition to form an expansible pressure chamber therewith, a main valve carried by said diaphragm, a central opening in said first partition slidably receiving said main valve for movement axially of said body responsive to displacement of said diaphragm, an orifice in said second partition having a main valve seat, a spring behind said diaphragm urging said main valve into seated relation with said main valve seat to close said orifice, a passage in said main valve connecting said inlet with said pressure chamber, a pilot valve in said passage, and temperature-sensitive means supported from said main valve and disposed in said inlet for opening said pilot valve in response to excessive temperatures in said inlet.

7. A pressure and temperature relief valve assembly comprising a hollow cylindrical body having an inlet at one end, first and second spaced transverse partitions in said body, an outlet in said body between said partitions, an axially displaceable transverse diaphragm in said body spaced from said first partition to form an expansible pressure chamber therewith, a main check valve carried by said diaphragm, a central opening in said first partition slidably receiving said main valve for movement axially of said body responsive to displacement of said diaphragm, an orifice in said second partition having a main valve seat, a spring behind said diaphragm urging said main valve into seated relation with said main valve seat to close said orifice, an axial passage in said main valve connected at one end to said inlet and connected at its other end to said chamber, expansible bellows in said inlet having a stem extending axially through said passage, means supporting said bellows from said main valve, a pilot valve on said stem adapted to normally close said passage and to open said passage responsive to expansion of said bellows, whereby fluid pressure in said inlet lifts said main valve directly to open said orifice, and fluid temperature in said inlet opens said pilot valve to permit fluid pressure in said inlet to act on said diaphragm and lift said main valve.

8. A pressure and temperature relief valve assembly comprising a hollow cylindrical body having an inlet at one end, first and second spaced rigid transverse partitions in said body, a lateral outlet in said body between said partitions, a transverse axially movable wall in said body spaced from said first rigid partition to form an expansible pressure chamber, a main valve carried by said movable wall, a central opening in said first rigid partition slidably receiving said main valve for movement axially of said body responsive to displacement of said movable wall, an orifice in said second rigid partition having a main valve seat, a spring behind said movable wall urging said main valve into seated relation with said main valve seat to close said orifice, whereby inlet fluid pressure on said main valve overcoming said spring displaces said main valve and movable wall and opens said main valve, a passage in said main valve connected to said pressure chamber, an axial tube extending through said orifice and connecting said passage to said inlet, a pilot valve seat in said axial tube and a pilot valve therefor adapted to open into said passage, a bellows casing supported from the outer end of said tube, a heat-expansible bellows secured at one end to said bellows casing and having a stem extending axially through said tube to support said pilot valve, whereby fluid temperature in said inlet expands said bellows and opens said pilot valve to permit fluid pressure in said inlet to displace said movable wall and lift said main valve, a shoulder in said body adjacent said movable wall, and fusible blocks carried by said movable wall for engaging said shoulder to normally limit displacement of said wall and opening of said main valve and being adapted to be melted by excess temperature of fluid in said chamber to permit additional opening of said main valve.

9. A pressure and temperature relief valve assembly comprising a body having an inlet and an outlet, a pressure responsive relief valve in said body separating said inlet from said outlet, a fluid chamber comprising a recess in the body, a piston in said chamber connected to said pressure valve for movement thereof in response to fluid pressure in said chamber acting between the body and one side only of the piston, a fluid passage in said pressure valve connecting the inlet with said one side of the piston, an auxiliary valve carried by said pressure valve disposed in said passage to control fluid flow to said one side of the piston, temperature sensing means carried by said pressure valve and connected to said temperature valve to open said auxiliary valve responsive to predetermined inlet temperature, said pressure valve being secured in said body for removal thereof without disconnecting said inlet or outlet, and said auxiliary valve and temperature sensing means being removable with said pressure valve as a unit to permit replacement with another preset auxiliary valve and temperature sensing means.

10. A temperature and pressure fluid relief valve assembly comprising a body having an inlet and an outlet, a pressure responsive main valve for impeding flow of fluid between the inlet and outlet, an annular recess in said body, said main valve extending axially into said recess, a piston in said recess carrying said main valve for movement thereof in response to fluid pressure acting between said body and one side only of the piston, a fluid passage in said main valve for the connection of said one side only of said piston with said inlet, an auxiliary valve carried by said main valve and disposed in said passage, and temperature sensitive means in said inlet carried by the main valve and connected to the auxiliary valve for actuation thereof in response to predetermined inlet fluid temperature.

11. A pressure and temperature relief valve assembly comprising a body having an inlet and an outlet, valve means separating said inlet from said outlet and including a pressure valve adapted to be opened responsive to pressure in said inlet and a temperature valve adapted to be opened responsive to temperature in said inlet, spring means biasing said pressure valve closed, a flexible bellows, heat expansible fluid in said bellows adapted to contract to form a partial vacuum therein when cooled and adapted to expand said bellows when heated, means connecting said bellows to said temperature valve to open the same responsive to heating of said fluid above a predetermined temperature, whereby contraction of said fluid in said bellows closes said temperature valve below said predetermined temperature, and means supporting said bellows in said inlet in exposed relation with pressure in said inlet, whereby rupture of said bellows equalizes pressure inside and outside said bellows and insures automatic opening of said temperature valve.

References Cited in the file of this patent

UNITED STATES PATENTS

| | | |
|---|---|---|
| 1,229,726 | Ebeling | June 12, 1917 |
| 1,848,031 | Spencer | Mar. 1, 1932 |
| 2,200,318 | Yonkers | May 14, 1940 |
| 2,271,850 | Zinkil | Feb. 3, 1942 |
| 2,389,437 | Kmiecik | Nov. 20, 1945 |
| 2,420,206 | Smith | May 6, 1947 |
| 2,570,432 | Dillon | Oct. 9, 1951 |